United States Patent Office 3,200,863
Patented Aug. 17, 1965

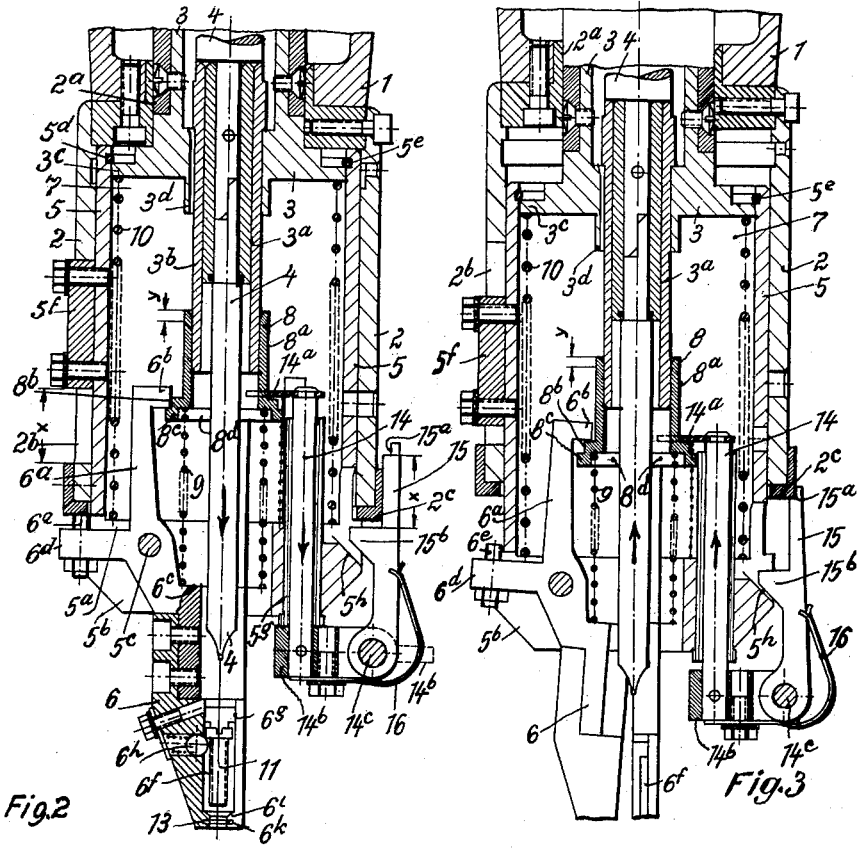
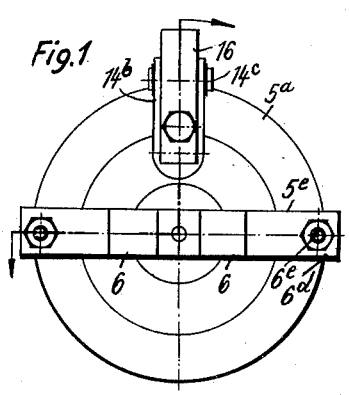
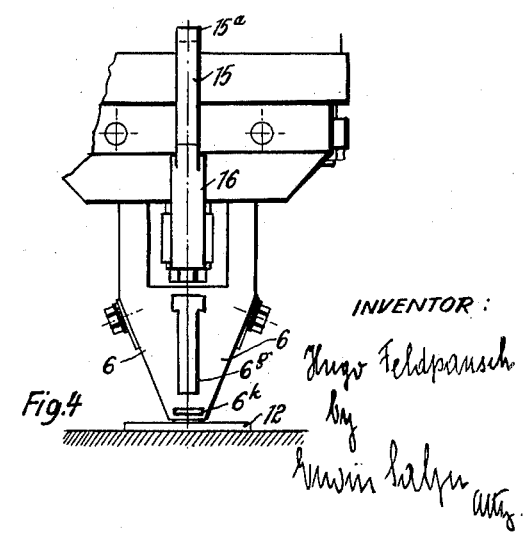

3,200,863
SCREW DRIVING MACHINES
Hugo Feldpausch, Ludenscheid, Germany, assignor to Feldpausch & Co., Ludenscheid, Germany, a firm of Germany
Filed June 25, 1962, Ser. No. 204,870
Claims priority, application Germany, July 1, 1961, F 34,319
5 Claims. (Cl. 144—32)

This invention has reference to screw driving machines as applied in assembling of many mass produced articles.

Such machines comprise a pair of pivotally supported tong members having a closed screw-holding position and an open screw-releasing position. The screw to be screwed into a workpiece is loosely held in position by and between said pair of tong members while being simultaneously rotated and pushed forward by a screw driver tool and thus inserted into an internally pre-screw-threaded hole in a workpiece.

Prior art devices of this description are subject to the limitation that the tong members may spread apart unintentionally during the screw-driving stroke of the screw driver tool, thus releasing or losing hold of a screw at a point of time of the duty cycle of the machine or device at which the screw should be held firmly in position by and between the pair of tong members.

It is, therefore, one object of the invention to provide improved screw driving machines which are not subject to the aforementioned limitation or drawback.

Prior art screw driving machines or devices tend to cause serious failures in case of insertion into them of a screw whose shank had accidentally not been screw-threaded, or when an attempt is being made to screw a screw into a bore which had accidentally not been internally screw-threaded. Generally screw driving machines are provided with a fluid motor, e.g. a pneumatic motor, for moving the rotating screw driver tool toward the workpiece into which a screw is to be driven. If the thread on the shank of a screw is missing, or very defective, or if the thread inside of a bore into which the screw is to be screwed is missing, or very defective, the pressure exerted by the screw driver tool upon the screw tends to tilt the latter on account of the fact that the screw cannot advance axially, or in a direction longitudinally of the screw driver tool, as it should.

It is, therefore, another object of this invention to provide improved screw driving machines which are not subject to the aforementioned limitation or drawback.

It is very often desirable to interpose a washer between a screw head and the workpiece into which the screw is to be driven. Prior art screw driving machines of the above description do not lend themselves well to this particular task.

It is, therefore, another object of this invention to provide improved screw driving machines which make it readily possible to insert a washer between a screw head and a workpiece.

The foregoing and other general and special objects of the invention and advantages thereof will more clearly appear from the ensuing particular description of the invention, as illustrated in the accompanying drawings wherein:

FIG. 1 is a bottom plan view of a machine or device embodying the present invention;

FIG. 2 is a vertical section of the machine or device shown in FIG. 1 taken along 2—2 of FIG. 1, showing the tong member latched in their closed screw-holding positions while the screw driver is moving toward the screw head and workpiece preparatory to driving a screw into the latter;

FIG. 3 is a section taken along the same line of FIG. 1 as FIG. 2, but showing the tong members in their open screw-releasing positions while the screw driver is moving away from the screw head and the workpiece upon having driven a screw into the latter; and FIG. 4 is a side elevation of the lower end of the tong members seen from the side thereof where the tong members are adapted to be fed, or supplied, with screws.

Attached to the lower end of a fixed frame structure 1 is a substantially tubular housing 2. In the region of housing 2 where the latter is secured to frame structure 1 there is a vertical cylindrical bearing surface 2a for a socket or spindle 3 adapted to be shifted in a direction longitudinally thereof. Spindle 3, in turn, supports a screw driver tool 4 adapted to be shifted in a direction longitudinally thereof as well as to be rotated. Screw driver 4 is fitted into the axial bore 3a of spindle 3. Housing 2 accommodates a sleeve member 5 closed at the bottom by transverse bottom wall 5a. Bottom wall 5a is provided with two slots 5b arranged along a diameter thereof, each of said slots 5b receiving one of a pair of tong members 6. Each tong member 6 is pivoted at 5c and has two arms each on opposite sides of pivot or fulcrum 5c. Reference numeral 7 has been applied to indicate the space inside of sleeve member 5. Each tong member 6 comprises an arm 6a projecting into space 7 and defining at the upper end thereof a latch 6b substantially at right angles to arm 6a. Mounted on spindle 3 is a sleeve 3b projecting relatively far into space 7 and supporting on the lower end thereof sleeve-shaped latch member 8. Sleeve 3b is not movable relative to spindle 3, but jointly movable with it. Latch member 8 is a solid of revolution and its outer surface 8a comprises upper shoulder 8b and lower shoulder 8c. Each shoulder 8b, 8c is formed by a cylindrical surface coaxial with spindle 3 and screw driver tool 4 and by a plane at right angles to the longitudinal axis of spindle 3 and screw driver tool 4. Reference numeral 9 has been applied to indicate a helical spring having an upper end resting at 8d against latch member 8 and a lower end resting against shoulder or projections 6c of tong members 6 situated below of pivots 5c biasing tong member 6 to the open position thereof. Spindle 3 is provided with a disc member 3c whose periphery engages the radially inner surface of sleeve member 5 and is thus guided by the latter. Sleeve member 5 has a circular groove 5d receiving a flexible internal retainer ring 5e. The latter forms a coupling between disc member 3c and sleeve member 5, i.e. the sleeve member 5 is raised by positive action when the disc member 3c is lifted. Reference numeral 10 has been applied to indicate a helical spring having an upper end resting against disc member 3c and a lower end resting against the horizontal bottom 5a of sleeve member 5. By virtue of spring 10 sleeve member 5 and tong members 6 are lowered whenever spindle 3 is being lowered. On the other hand, spindle 3 may be moved to a limited extent relative to sleeve member 5. To limit the relative movement between spindle 3 and sleeve member 5 housing 2 is provided with a lateral slot 2b extending in a direction longitudinally thereof and sleeve member 5 is provided with a key 5f integral therewith and engaging slot 2b and being guided in and by the latter. Tong members 6 are provided with projections 6d extending radially outwardly and arranged adjacent pivots 5. Each projection 6d carries an adjustable abutment screw 6e. Abutment screws 6e engage the lower end surface 2c of housing 2 when sleeve member 5 is moved upwardly by spindle 3 by the intermediary of retainer ring 5e.

Disc member 3c of spindle 3 is provided with an annular axial abutment projection 3d. The diameter of projection 3d is selected in such a fashion that projection 3d engages the upper end surface of sleeve-shaped latch member 8 during downward strokes of spindle 3. As a result, latch member 8 is moved downwardly by abutment projection 3d a relatively small distance indicated by the reference character y. This small travel of latch member 8 is, however, sufficient to cause disengagement of latches 6b from shoulder 8b and resulting in a radially inner movement of latches 6b toward the lateral surface 8a of latch member 8. The lower ends of tong members 6 are adapted to grip and hold the shank of a screw 11 intended to be driven or screwed into a workpiece 12. As will be explained below more in detail the lower ends of tong members 6 are further adapted to grip and hold a washer 13 intended to be interposed between the head of screw 11 and workpiece 12. When parts 6a, 6b are caused to rock about pivots 5c in the fashion which has been described above, resulting in a radially inner movement of latches 6b, the lower ends of tong member 6 part and thus release the head of screw 11 which, heretofore, had been gripped and held between them. This occurs anytime upon insertion of a screw 11 into a workpiece 12 by the operation of screw driver tool 4.

The lower ends of tong members 6 define a cylindrical space or cavity 6f having an upper opening 6g for inserting a screw 11 into it. This is effected by means of an appropriate screw feeding device (not shown). Each of the lower ends of tong members 6 is further provided with a horizontal or transverse channel receiving a steel ball 6h which is spring biased radially inwardly, i.e. toward the longitudinal axis of screw driver tool 4. Steel balls 6h serve the purpose of achieving a satisfactory alignment between screws 11 and the screw driver tool 4, moving radially outwardly when the screws 11 are moved downwardly by screw driver tool 4 toward workpiece 11. A short downwardly tapered screw passage 6i defined by tong member 6 is arranged below of screw receiving space or cavity 6. This passage guides screws 11 when rotated by screw driver tool 4 toward the particular point in workpiece 12 where they are supposed to be inserted into the latter. Each tong member 6 is further provided with a transverse slot 6k situated below passage 6i. Slots 6k are adapted to receive washers 13 to be arranged between the heads of screws 11 and workpiece 12. Washers 13 are released by tong members 6 when the latter part, as described above, and thereby release screws 11. Washers 13 are fed to slots 6k by an appropriate feeding device (not shown).

Assuming now that a screw 11 has been fed into screw-receiving space 6f and that screw driver tool 4 has been moved downwardly into engagement with the head of screw 11 and is rotating the latter. As spindle 3 moves downwardly its motion is transmitted by the intermediary of spring 10 to sleeve member 5 and consequently to tong members 6. This downward movement of sleeve 5 is is limited to a distance x. Upon having travelled said distance x key 5f sliding in slot 3b is stopped by, and at, the lower end thereof. Latches 6b remain initially at rest in their latching position on shoulder 8b of sleeve-shaped latch member 8 since the latter moves downwardly in the same fashion as latches 6b. When screw 11 has been screwed into workpiece 12 by the operation of screw driver tool 4, abutment projection 3d of disc member 3c of spindle 3 engages the upper end surface of sleeve-shaped latch member 8 whereby the latter is moved downwardly a distance y. As a result of the relative movement between latches 6b and sleeve-shaped latch member 8, latches 6b are disengaged from shoulder 8b and move radially inwardly, the lower ends of tong members 6 moving radially outwardly and thus releasing screw 11 and washer 13. This release motion of parts 11 and 13 by tong members 6 is due to the bias of tong members 6 by helical spring 9.

As is apparent from the foregoing screw driver tool 4 is under the control of control means which determine the length and duration of the downward stroke thereof. When a duty cycle has been performed by screw driver tool 4 its spindle 3 as well as the screw driver tool itself are jointly raised to the initial upper position thereof. As spindle 3 is raised retainer ring 5d lifts sleeve member 5 and tong members 6 to the upper limit position thereof. This limit position is reached when key 5f engages the upper end of slot 3b, precluding further upward movement of parts 5 and 6. Shortly before the upper limit position of parts 5 and 6 is reached, abutment screws 6e on projections 6d of tong member 6 abut against the lower end surface 2c of housing 2, causing tong members 6 to pivot radially about pivots 5c to the position wherein latches 6b have their maximum separation. In that position of latches 6b sleeve shaped latch member 8 is free to move into the gap formed between latches 6b with its upper relatively narrow shoulder 8b, the relatively wide shoulder 8c below limiting the relative axial movement of parts 6b and 8. Now tong members 6 are relatched in the closed positions thereof.

Assuming now that an imperfect screw 11 has been inserted into screw-receiving space or cavity 6f, i.e. a screw whose shank is not threaded, or assuming that the bore in workpiece 12 into which screw 11 is intended to be driven or screwed by screw driver tool 4 has not been threaded. This keeps screw driver tool 4 from moving down all the way to the lower limit position thereof. Such a situation must be remedied, and the following means are provided to this end. Sleeve member 5 has a bore 5g extending parallel to spindle 3 and screw driver tool 4 receiving a pull rod 14 movable in a direction longitudinally thereof inside of bore 5g. The upper end of rod 14 is provided with a fork member 14a whose prongs extend to both sides of sleeve-shaped latch member 8 and are adapted to operate the latter. To be more specific, upon a downward movement of rod 14 indicated by an arrow thereon—which downward movement can be effected manually, if desired, by means of operating element 14b—sleeve shaped latch member 8 is likewise moved downwardly out of engagement with latches 6b. Preferably the aforementioned downward movement of part 14 is effected automatically. To this end operating element 14b is provided with a pivot pin 14c supporting latch element 15 under bias of leaf spring 16. Latch 15 has a lateral projection 15b and an upper latch surface 15a spaced distance x from lateral projection 15b, as indicated in the drawings. Latch surface 15a is adapted to cooperatively engage the lower end surface 2c of housing 2 whenever sleeve member 5 has been moved sufficiently far in downward direction to allow such engagement. Upon engagement of latch surfaces 2c and 15a sleeve shaped latch member 8 is latched or retained in a relatively low position until such time as latch surfaces 2c and 15a are again separated. Separation of latch surfaces 2c and 15a is effected automatically by the oblique or slanting surfaces of lateral projections 15b adapted to be engaged by like oblique or slanting abutment surfaces 5h of sleeve member 5, and thereby to be pivoted radially outwardly about pivots or pins 14c. If either the thread on the shank of screw 11 is defective, or the internal thread in the bore in workpiece 12 into which screw 11 is to be inserted is defective, parts 8 and 6b are not unlatched during the downward stroke of spindle 3 and parts 14a, 14, 15 maintain sleeve shaped latch member 8 in the lowest position it has reached. Sleeve member 5 is, however, free to move upwardly from the lowest position it may have reached in case of the aforementioned defect, taking with it pivots 5c and tong members 6. This relative movement between sleeve-shaped latch member 8 and tong members 6 allows latches 6b to snap radially inwardly toward cylindrical surface 8a of sleeve-shaped latch member 8, resulting in separation of the lower ends of tong members 6. This, in turn, releases the screw 11 which could not be inserted into a registering bore on account of a defect of the thread on the shank of the screw or a defect of the thread in the bore. Release of screw 11 makes it possible to check the faulty situation and to eliminate the fault by removal of the faulty screw, or workpiece, respectively.

It will be apparent from a consideration of the drawings that the wall thickness of sleeve 3b could be reduced to zero or, in other words, sleeve 3b could be dispensed with. In this case sleeve-shaped latch member 8 will be slidably mounted in axial direction directly on screw driver tool 4 rather than on sleeve 3b. Such a change makes it also possible to dispense with axial abutment projection 3d, or the length of sleeve-shaped latch member projection 3d is dispensed with, the function thereof must be performed by the lower end surface of spindle 3. To this end the lower end surface of spindle 3 must be arranged at the same level as the lower end of abutment projection 3d, or the length of sleeve-shaped latch member 8 must be altered to effect downward movement of the latter at the proper point of time of the duty cycle.

It will be apparent from the foregoing that tong members 6 are positively latched in the closed position thereof from the beginning of the downward stroke of screw driver tool 4 until engagement of parts 3d and 8, and consequent relative movement of parts 8 and 6b. Tong members 5 are then moved to their open positions, i.e. during the last portion of the downward stroke of screw driver tool 4 after the screw has been screwed into a workpiece. Tong members 6 are reclosed at the end of the upward stroke of screw driver tool 4.

The duty cycle is changed if relative movement between parts 8 and 6b and consequent opening of tong members 6 is obstructed during the downward stroke of screw driver tool 4. In that instance tong members 6 remain positively latched in the closed position thereof during the entire downward stroke of screw driver tool 4, and also during a portion of the upward stroke thereof. During the upward stroke of screw driver tool 4 tong members 6 are unlatched and caused to snap open, and at the end of the upward stroke of screw driver tool 4 tong members 6 are reclosed and positively latched in the closed position thereof.

It will be apparent from the foregoing that sleeve member 5 forms a support for tong members 6. A sleeve-shaped support for tong members 6 is particularly desirable because it lends itself readily to be guided along a straight path, but the support for tong members 6 must not necessarily be sleeve-shaped.

It will be further apparent from the foregoing that parts 8 and 6b are latching means for tong members 6 responsive to the position of screw driver tool 4 relative to fixed frame structure 1, and that parts 3d, 8 are unlatching means responsive to the position of screw driver tool 4 relative to frame structure 1.

The machine or device is further provided with auxiliary unlatching means responsive to the position of screw driver tool 4 relative to frame structure 1 which means become operative only in case of failure of the first-mentioned unlatching means 3d and 8. These auxiliary unlatching means comprise parts 14, 14a, 14b, 14c, 15, 15a, 2c and 16. Parts 15b and 5h also pertain to the aforementioned auxiliary unlatching means.

Parts 6d, 6e and 2c are re-latching means for causing re-latching of parts 8 and 6b at the end of the upward stroke of screw driver tool 4.

Support 5, tong members 6 and spring 9 form a screw holder for screws 11. Parts 3c and 5d form a suspension for sleeve-shaped support 5 and they form also cooperating abutments for causing joint movement of support 5 with the spindle or operating means 3 for screw driver tool 4 during the reciprocatory upward motion of spindle 3 and screw driver tool 4 toward frame structure 1.

Having disclosed a preferred embodiment of my invention it is desired that the same not be limited to the particular structure disclosed. It will be obvious to any person skilled in the art that many modifications and changes may be made without departing from the broad spirit and scope of my invention. Therefore it is desired that the invention be interpreted as broadly as possible and that it be limited only as required by the prior state of the art.

I claim as my invention:

1. A screw driving machine comprising in combination:
   (a) a substantially tubular fixed housing defining a pair of housing abutments adjacent the lower end thereof;
   (b) a sleeve member arranged inside said housing and slidable therein between an upper limit position and a lower limit position, said sleeve member defining a pair of radial slots each for receiving one of a pair of cooperating tong members;
   (c) a rotatable spindle arranged inside said sleeve member in coaxial relation thereto, slidable therein between an upper limit position and a lower limit position and guided by said sleeve member when sliding therein;
   (d) coupling means establishing a positive connection between said sleeve member and said spindle causing said spindle when lifted to lift said sleeve member within said housing;
   (e) a first helical spring interposed between said sleeve member and said spindle biasing said sleeve member and said spindle in opposite directions;
   (f) a screw driver tool supported and operated by said spindle;
   (g) a sleeve-shaped latch member loosely supported on said spindle to allow relative movement of said spindle and said latch member in a direction longitudinally of said spindle, said latch member defining a first abutment means extending substantially parallel to the axis of said spindle and said latch member defining a second means abutment surfaces extending substantially at right angles to the axis of said spindle;
   (h) a screw holder including a pair of cooperating tong members each arranged in one of said pair of radial slots of said sleeve member and pivotally supported on said sleeve member and having a closed screw-holding position and an open screw-releasing position, said pair of tong members defining a first pair of latch surfaces adapted to be engaged by said first abutment means of said latch member for precluding pivotal movement of said pair of tong members toward said open screw-releasing position thereof, said pair of tong members defining a second pair of latch surfaces adapted to engage said second abutment means of said latch member for coupling said latch member to said pair of tong members to cause lowering of said latch member when said sleeve member and said pair of tong members are lowered, each of said pair of tong members further having a transverse abutment arm cooperatively engaging one of said pair of housing abutments to pivot said pair of tong members upon lifting of said sleeve member by said spindle from said open screw-releasing position to said closed screw-holding position thereof;
   (i) a second helical spring interposed between said latch member and said pair of tong members biasing said latch member in a direction longitudinally of said spindle and biasing said pair of tong members to said open screw-releasing position thereof; and
   (j) an abutment jointly movable with and positively operated by said spindle adapted to engage and move said latch member against the bias of said second spring in a direction longitudinally of said spindle to cause disengagement of said first abutment means of said latch member from said first pair of latch surfaces of said pair of tong members and pivotal movement of said pair of tong members under the action of said second spring to said open screw-releasing position thereof.

2. A screw driving machine comprising in combination:
(a) a substantially tubular fixed housing defining a pair of housing abutments adjacent the lower end thereof;
(b) a sleeve member arranged inside said housing and slidable therein between an upper limit position and a lower limit position, said sleeve member defining a pair of radial slots each for receiving one of a pair of cooperating tong members;
(c) a rotatable spindle arranged inside said sleeve member in coaxial relation thereto, slidable therein between an upper limit position and a lower limit position and guided by said sleeve member when sliding therein;
(d) coupling means establishing a positive connection between said sleeve member and said spindle causing said spindle when lifted to lift said sleeve member within said housing;
(e) a first helical spring interposed between said sleeve member and said spindle biasing said sleeve member and said spindle in opposite directions;
(f) a screw driver tool supported and operated by said spindle;
(g) a sleeve-shaped latch member loosely supported on said spindle to allow relative movement of said spindle and said latch member in a direction longitudinally of said spindle, said latch member defining a first abutment means extending substantially parallel to the axis of said spindle and said latch member defining a second abutment means extending substantially at right angles to the axis of said spindle;
(h) a screw holder including a pair of cooperating tong members each arranged in one of said pair of radial slots of said sleeve member and pivotally supported on said sleeve member and having a closed screw-holding position and an open screw-releasing position, each of said pair of tong members defining a first latch surface adapted to engage said first abutment means of said latch member to positively lock said pair of tong members in said closed screw-holding position thereof, each of said pair of tong members further defining a second latch surface adapted to engage said second abutment means of said latch member for coupling said latch member and said pair of tong members for joint movement under the bias imparted to said sleeve member by said first spring, each of said pair of tong members having a transverse abutment arm cooperatively engaging one of said pair of housing abutments to pivot said pair of tong members from said open screw-releasing position to said closed screw-holding position, and said pair of tong members jointly defining in said closed screw-holding position thereof a screw-receiving duct providing a first guide means for the head of a screw inside said duct and providing a second guide means spaced from said first guide means for the shank of a screw inside said duct;
(i) a second helical spring interposed between said latch member and said pair of tong members biasing said latch member in a direction longitudinally of said spindle and biasing said pair of tong members to said open screw-releasing position thereof; and
(j) an abutment jointly movable with and positively operated by said spindle adapted to engage and move said latch member against the bias of said second spring in a direction longitudinally of said spindle to cause disengagement of said first abutment means of said latch member from said first pair of latch surfaces of said pair of tong members and pivotal movement of said pair of tong members under the action of said second spring to said open screw-releasing position thereof.

3. A machine as specified in claim 1 comprising in combination:
(a) a rod arranged parallel to said screw driver tool and slidable in a direction longitudinally thereof within a bore defined by said sleeve member;
(b) a fork-shaped unlatching member integral with said rod engaging said sleeve-shaped latch member; and
(c) manually operable means for sliding said rod within said bore to move said sleeve-shaped latch member against the bias of said second spring to a position allowing said pair of tong members to snap from said closed screw-holding position thereof to said open screw-releasing position thereof.

4. A machine as specified in claim 1 comprising in combination:
(a) an auxiliary latch mechanism for restraining said sleeve-shaped latch member in a predetermined axial position thereof, said auxiliary latch mechanism including a pivotable spring-biased latch element adapted to cooperatively engage said housing to preclude relative movement between said auxiliary latch mechanism and said housing; and
(b) auxiliary abutment means integral with said sleeve member adapted to abut against said latch element to cause disengagement thereof from said housing upon a predetermined travel of said sleeve member toward said sleeve-shaped latch member.

5. A screw driving machine as specified in claim 2 comprising in combination:
(a) a pull rod arranged parallel to said screw driver tool and having a fork-shaped end cooperatively engaging said sleeve-shaped latch member;
(b) bearing means in said sleeve member loosely guiding said rod in a direction longitudinally thereof;
(c) a spring biased latch element pivotally supported on said rod adapted to latch said rod and said latch element in position at a predetermined point of the sliding motion of said spindle from said upper limit position to said lower limit position thereof; and
(d) cooperating abutment means on said latch element and on said sleeve member for unlatching said latch element at a predetermined point of the sliding motion of said spindle from said lower limit position to said upper limit position thereof.

References Cited by the Examiner
UNITED STATES PATENTS

| | | | |
|---|---|---|---|
| 944,561 | 12/09 | Kenan | 144—32 |
| 1,383,429 | 7/21 | Russell. | |
| 1,889,330 | 11/32 | Humes. | |
| 2,276,470 | 3/42 | Dodelin | 145—51 |
| 2,845,968 | 8/50 | Luber | 144—32 |
| 3,011,534 | 12/61 | Vilmerding | 144—32 |

WILLIAM W. DYER, Jr., *Primary Examiner.*

DONALD R. SCHRAN, *Examiner.*

UNITED STATES PATENT OFFICE
CERTIFICATE OF CORRECTION

Patent No. 3,200,863                      August 17, 1965

Hugo Feldpausch

It is hereby certified that error appears in the above numbered patent requiring correction and that the said Letters Patent should read as corrected below.

Column 1, line 68, for "member" read -- members --; column 3, line 37, for "6" read -- 6f --; column 4, line 9, for "member" read -- members --; column 5, line 10, for ", or the length of sleeve-shaped latch mem-" read -- on disc member 3c of spindle 3. If abut- --; column 6, line 35, for "means abutment surfaces" read -- abutment means --.

Signed and sealed this 26th day of April 1966.

(SEAL)
Attest:

ERNEST W. SWIDER                        EDWARD J. BRENNER
Attesting Officer                            Commissioner of Patents